US012607865B2

(12) United States Patent
Welte

(10) Patent No.: US 12,607,865 B2
(45) Date of Patent: Apr. 21, 2026

(54) QUANTUM INFORMATION PROCESSING SYSTEMS

(71) Applicant: IonQ, Inc., College Park, MD (US)

(72) Inventor: Joachim Welte, Carrboro, NC (US)

(73) Assignee: IonQ, Inc., College Park, MD (US)

( * ) Notice: Subject to any disclaimer, the term of this patent is extended or adjusted under 35 U.S.C. 154(b) by 290 days.

(21) Appl. No.: 18/484,033

(22) Filed: Oct. 10, 2023

(65) Prior Publication Data

US 2024/0118551 A1 Apr. 11, 2024

Related U.S. Application Data

(60) Provisional application No. 63/378,968, filed on Oct. 10, 2022.

(51) Int. Cl.
G02B 27/09 (2006.01)

(52) U.S. Cl.
CPC ..... G02B 27/0927 (2013.01); G02B 27/0972 (2013.01); G02B 27/0977 (2013.01)

(58) Field of Classification Search
CPC ............ G02B 27/0927; G02B 27/0972; G02B 27/0977

USPC .......................................................... 359/837
See application file for complete search history.

(56) References Cited

U.S. PATENT DOCUMENTS

2009/0002833 A1* 1/2009 Shklover ............. B23K 26/032
                                                    359/857

* cited by examiner

*Primary Examiner* — Bumsuk Won
*Assistant Examiner* — Mitchell T Oestreich
(74) *Attorney, Agent, or Firm* — ARENTFOX SCHIFF LLP

(57) ABSTRACT

Aspects of the present disclosure relate generally to systems and methods for use in the implementation and/or operation of quantum information processing (QIP) systems, and more particularly, to implementation of beam shaping structures to the QIP systems. Beam shaping structures can include a first prism, a mirror, and second prism arranged at distance from one another and configured to receive and reflect a laser beam to shape the beam upon exit from the structure. Such beam shaping structures provide flexibility to the QIP system by permitting easy exchange of optical elements in order to achieve different laser beam spot aspect ratios.

20 Claims, 7 Drawing Sheets

400

415d

430

410

415c

425

420

415a

415b

435

QUANTUM INFORMATION PROCESSING SYSTEMS

This application claims the benefit of U.S. Patent Application No. 63/378,968, entitled "QUANTUM INFORMATION PROCESSING SYSTEMS" and filed on Oct. 10, 2022, which is expressly incorporated by reference herein in its entirety as if set forth herein.

TECHNICAL FIELD

Aspects of the present disclosure relate generally to systems and methods for use in the implementation, operation, and/or use of quantum information processing (QIP) systems.

BACKGROUND

Trapped atoms are one of the leading implementations for quantum information processing or quantum computing. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

It is therefore important to develop new techniques that improve the design, fabrication, implementation, control, and/or functionality of different QIP systems used as quantum computers or quantum simulators, and particularly for those QIP systems that handle operations based on atomic-based qubits.

In particular, beam shaping a laser beam to create a desired aspect ratio is useful for QIP systems. A laser beam shape is typically defined by its irradiance distribution and phase, the phase being important in determining the uniformity of a beam profile over its propagation distance. Beam shapers redistribute the irradiance and phase of an optical beam to attain a desired beam profile that is maintained along the desired propagation distance. For example, circularized beam profiles are desirable for certain QIP system applications. Circularized beams may be shaped, for example, by introducing a pair of cylindrical lenses in the beam path.

However, these techniques include drawbacks including requiring the spacing between the lenses to be adjusted to produce a collimated beam, and if there is any slight rotation between the axes of the lenses astigmatism is introduced on the diagonal axes. Astigmatism leads to a rotation of the intensity distribution through focus and increases the beam size along the horizontal and vertical axes. Further, cylindrical lenses are not precise and typically have larger errors than other optical elements, such as optical flats. These errors can be, for example, in surface form, or in twist of the cylindrical axis as compared to the rectangular cut of the lens. Addressing these errors is very cost-intensive.

It is therefore important to develop new systems that shape circularized beam profiles without encountering the aforementioned drawbacks.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

This disclosure describes various aspects of systems and methods for use in the implementation and/or operation of quantum information processing (QIP) systems, and more particularly, to implementation of beam shaping structures to the QIP systems.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

In an aspect, the quantum information processing (QIP) systems provided herein include a laser beam source configured to generate a laser beam to illuminate one or more ions, and include a beam shaping structure. In one or more implementations, the beam shaping structure includes a housing, a first prism arranged in the housing to receive the laser beam, a mirror arranged in the housing to reflect the laser beam after it passes through the first prism, and a second prism arranged in the housing to receive the laser beam after it reflects off the mirror, in which the first prism, the mirror, and the second prism can be arranged at angles to one another to reshape the laser beam. The beam shaping structure further reshapes the beam to a desired (e.g., a predetermined as set by a system designer) aspect ratio. For example, the desired aspect ratio can be between 0.01 and 100. In another example, the desired aspect ratio can be between 0.1 to 10. The first prism can be a rectangular prism, or can be a 30/60/90 prism, for example. In one or more implementations, the system further includes a rotating platform arranged in the housing to receive the mirror. The rotating platform can be configured to receive a plurality of mirrors at different angles relative to the first prism and second prism. In one or more implementations, the system further includes a rotating platform arranged in the housing to receive the first or second prisms. In one or more implementations, the reshaped laser beam has a round shape or an elliptical shape. Additionally, at least one of the first prism, the mirror, or the second prism of the system can include a coating on a surface in one or more implementations.

Further, in one or more implementations, the beam shaping structure further includes a second mirror arranged in the housing to reflect the laser beam after it passes through the second prism, a third prism arranged in the housing to receive the laser beam after it reflects off the second mirror, in which the second mirror and the third prism can be arranged at angles to one another to further reshape the laser beam. For example, the laser beam can be reshaped to a desired aspect ratio in an axis different than that of the first prism, the mirror, and the second prism.

Further, in one or more implementations, the beam shaping structure can be replaceable by a second beam shaping structure including a second housing, a third prism arranged in the second housing to receive the laser beam, a second mirror arranged in the second housing to reflect the laser beam after it passes through the third prism, and a fourth prism arranged in the second housing to receive the laser beam after it reflects off the second mirror, in which the third prism, the second mirror, and the fourth prism can be arranged at angles to one another to reshape the laser beam to a different desired aspect ratio than the desired aspect ratio formed by the beam shaping structure.

Further in one or more implementations, the beam shaping structure includes a third prism arranged in the housing to receive the laser beam, a second mirror arranged in the housing to reflect the laser beam after it passes through the third prism, and a fourth prism arranged in the housing to receive the laser beam after it reflects off the second mirror, in which the third prism, the second mirror, and the fourth prism can be arranged at angles to one another to reshape the laser beam and magnify it in a same direction as the first prism, the mirror, and the second prism.

Further in one or more implementations, the beam shaping structure includes a third prism arranged in the housing to receive the laser beam, a second mirror arranged in the housing to reflect the laser beam after it passes through the third prism, and a fourth prism arranged in the housing to receive the laser beam after it reflects off the second mirror, in which the third prism, the second mirror, and the fourth prism can be arranged at angles to one another to reshape the laser beam and magnify it in a different direction as the first prism, the mirror, and the second prism.

In another aspect, the quantum information processing (QIP) systems provided herein include a laser beam source configured to generate a laser beam to illuminate one or more ions, and include a beam shaping structure. In one or more implementations, the beam shaping structure includes a housing, a first prism and a second prism arranged in the housing to receive the laser beam, in which the first prism and the second prism can be arranged at angles to one another to reshape the laser beam.

In another aspect, the quantum information processing (QIP) systems provided herein include a laser beam source configured to generate a laser beam to illuminate one or more ions, and include a beam shaping structure. In one or more implementations, the beam shaping structure include a housing, a first optical element arranged in the housing having a plurality of surfaces to receive the laser beam, a mirror arranged in the housing to reflect the laser beam after it passes through the first optical element, and a second optical element arranged in the housing having a plurality of surfaces to receive the laser beam after it reflects off the mirror, in which the first optical element, the mirror, and the second optical element can be arranged at angles to one another to reshape the laser beam. Additionally, in one or more implementations, the plurality of surfaces of the first optical element can be arranged at an angle from one another.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
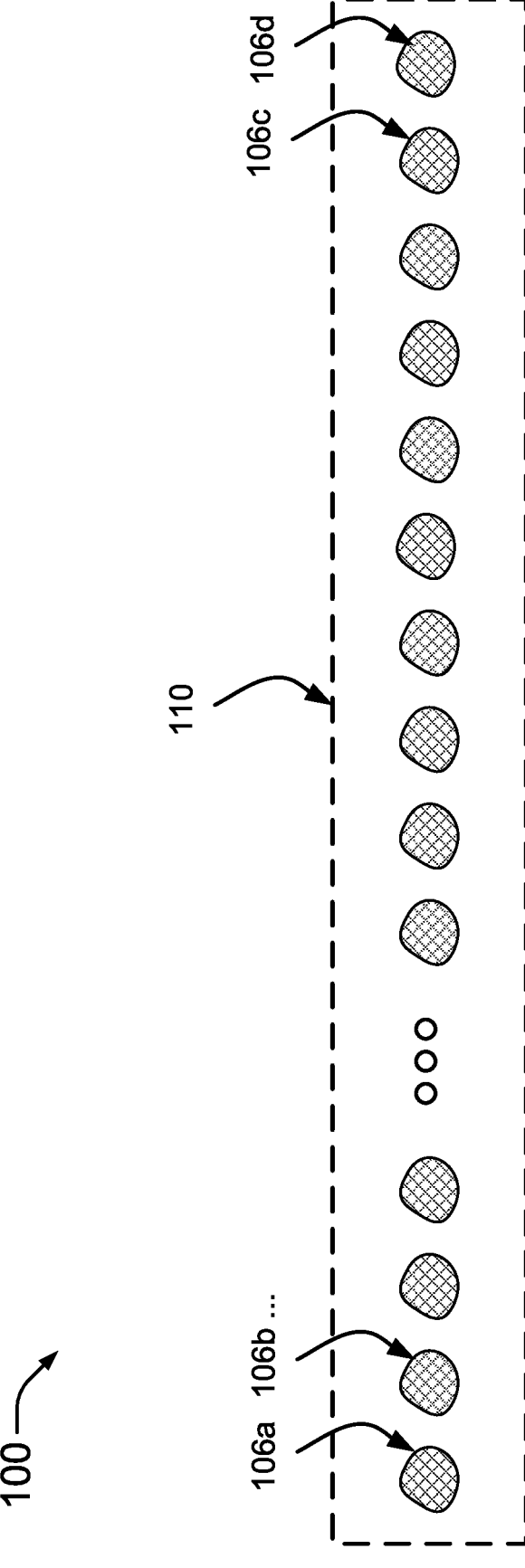
FIG. 1 illustrates a view of atomic ions a linear crystal or chain in accordance with aspects of this disclosure.

The detailed description set forth below in connection with the appended drawings or figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well known components are shown in block diagram form, while some blocks may be representative of one or more well-known components.

In the field of quantum information processing (QIP) systems, it is common to use laser beams to illuminate trapped ions. In doing so, it is advantageous for the QIP system to shape the laser beam to a particular shape in order to achieve desired results when the beam interacts with the trapped ions. The location in which the laser beam is being focused, i.e., the area of a surface illuminated by the laser, is the beam spot or laser spot. For example, a beam can be shaped such that the beam spot is round, elliptical, square, linear, triangular, rectangular, or other two-dimensional shapes. In order to produce a well-defined Gaussian beam with only one central beam spot and no higher diffraction orders, refractive beam shaping may be implemented. Shaping the beam can be performed by introducing one or more optical elements in the pathway of the laser beam, such as lenses, mirrors, gratings, prisms, or other elements. Such optical elements may be aspheric or freeform lenses and other diffractive elements capable of redistributing the irradiance and phase profile of laser light. As the beam passes through optical elements, the amplitude and phase of the beam change and efficiently shape the beam into the desired shape.

In implementations in which an elliptical beam is desirable, it is advantageous to be able to obtain specific aspect ratios for the laser beam when comparing the horizontal and vertical cross-sections of the beam spot—i.e., the ellipticity of the beam spot. Beam shaping of an initially circular beam into an elliptical beam may be achieved by locating a pair of cylindrical lenses in the laser beam path at different focal lengths. Each lens refracts the laser beam, expanding its width and length to the desired size as a result of different divergence angles in the horizontal and vertical axes. However, such an approach contains drawbacks, and in particular circular or elliptical beam shaping using cylindrical lenses suffers from alignment issues. For example, the spacing between the lenses has to be adjusted to produce a collimated beam. Further, such systems are alignment sensitive. For example, if a different aspect ratio of the beam spot is desired, any slight rotation—e.g., less than 0.5 degree— between the axes of the lenses introduces astigmatism on the diagonal axes. Astigmatism leads to a rotation of the intensity distribution through focus and increases the beam size along the horizontal and vertical axes. Addressing these issues can be cost-intensive.

Circular beam shaping may also be achieved by introducing anamorphic prism pairs along a laser beam path. Prisms can be manufactured to very high precision, at comparatively much lower cost than cylindrical lenses. Anamorphic prism pairs are pairs of prisms placed at a distance from one another and at an angle such that the laser beam is refracted as it passes through each prism in the pair. Refraction by each prism changes the beam radius in one axis and changes the beam direction such that in combination, the pair of prisms manipulate the ellipticity of the beam while maintaining the original direction of propagation. As with cylindrical lens pairs, anamorphic prism pairs require precise angular alignment. Additionally, the requirement of precise alignment of anamorphic prism pairs introduces the disadvantage of a magnification dependent displacement of the transmitted beam as compared to the incident axis. Magnification-dependent displacement is problematic as it prevents the prism pair from being easily inserted into an existing optomechanical design. Even if the initial optomechanical design accounts for some displacement, the aspect ratio of the beam is locked in by the initial design choice. If, for example, the aspect ratio is desired to change from 1 to 6 to 1 to 8, by adjusting the prisms to magnify the beam and change the aspect ratio, the displacement of the laser beam is correspondingly changed, thus frustrating the existing optomechanical design.

As such, provided herein in one or more implementations are QIP systems for trapping ions that include a laser beam source and a beam shaping structure arranged to minimize or remove beam displacement effects.

Solutions to the issues described above are explained in more detail in connection with FIGS. 1-4D, with FIGS. 1-3 providing a background of QIP systems or quantum computers, and more specifically, of atomic-based QIP systems or quantum computers.

Figure 2:
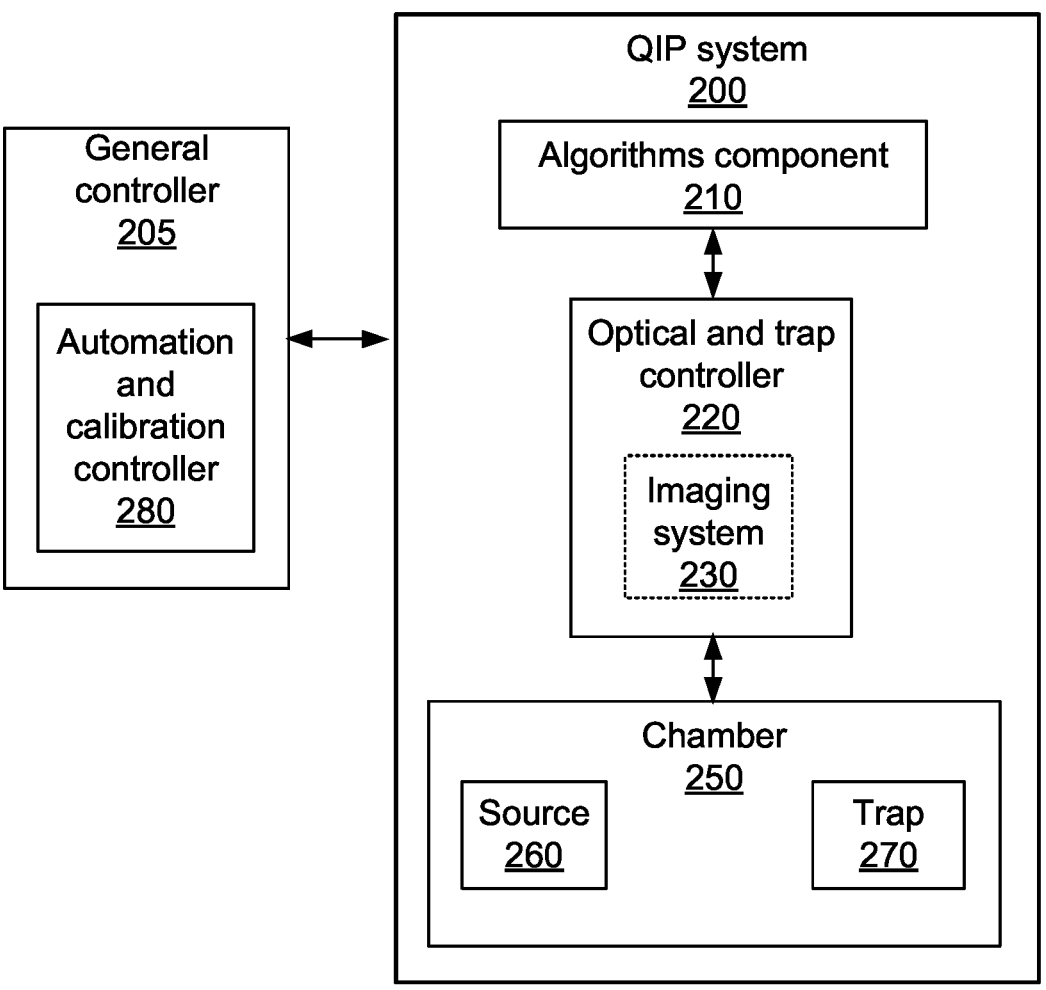
FIG. 2 illustrates an example of a quantum information processing (QIP) system in accordance with aspects of this disclosure.

FIG. 1 illustrates a diagram 100 with multiple atomic ions or ions 106 (e.g., ions 106a, 106b, . . . , 106c, and 106d) trapped in a linear crystal or chain 110 using a trap (not shown; the trap can be inside a vacuum chamber as shown in FIG. 2). The trap may be referred to as an ion trap. The ion trap shown may be built or fabricated on a semiconductor substrate, a dielectric substrate, or a glass die or wafer (also referred to as a glass substrate). The ions 106 may be provided to the trap as atomic species for ionization and confinement into the chain 110. Some or all of the ions 106 may be configured to operate as qubits in a QIP system.

In the example shown in FIG. 1, the trap includes electrodes for trapping or confining multiple ions into the chain 110 laser-cooled to be nearly at rest. The number of ions trapped can be configurable and more or fewer ions may be trapped. The ions can be Ytterbium ions (e.g., $^{171}Yb^+$ ions), for example. The ions are illuminated with laser (optical) radiation tuned to a resonance in $^{171}Yb^+$ and the fluorescence of the ions is imaged onto a camera or some other type of detection device (e.g., photomultiplier tube or PMT). In this example, ions may be separated by a few microns (μm) from each other, although the separation may vary based on architectural configuration. The separation of the ions is determined by a balance between the external confinement force and Coulomb repulsion and does not need to be uniform. Moreover, in addition to Ytterbium ions, neutral atoms, Rydberg atoms, or other types of atomic-based qubit technologies may also be used. Moreover, ions of the same species, ions of different species, and/or different isotopes of ions may be used. The trap may be a linear RF Paul trap, but other types of confinement devices may also be used, including optical confinements. Thus, a confinement device may be based on different techniques and may hold ions, neutral atoms, or Rydberg atoms, for example, with an ion trap being one example of such a confinement device. The ion trap may be a surface trap, for example.

FIG. 2 illustrates a block diagram that shows an example of a QIP system 200. The QIP system 200 may also be referred to as a quantum computing system, a quantum computer, a computer device, a trapped ion system, or the like. The QIP system 200 may be part of a hybrid computing system in which the QIP system 200 is used to perform quantum computations and operations and the hybrid computing system also includes a classical computer to perform classical computations and operations. The quantum and classical computations and operations may interact in such a hybrid system.

Shown in FIG. 2 is a general controller 205 configured to perform various control operations of the QIP system 200. These control operations may be performed by an operator, may be automated, or a combination of both. Instructions for at least some of the control operations may be stored in memory (not shown) in the general controller 205 and may be updated over time through a communications interface (not shown). Although the general controller 205 is shown separate from the QIP system 200, the general controller 205 may be integrated with or be part of the QIP system 200. The general controller 205 may include an automation and calibration controller 280 configured to perform various calibration, testing, and automation operations associated with the QIP system 200. These calibration, testing, and automation operations may involve, for example, all or part of an algorithms component 210, all or part of an optical and trap controller 220 and/or all or part of a chamber 250.

The QIP system 200 may include the algorithms component 210 mentioned above, which may operate with other parts of the QIP system 200 to perform or implement quantum algorithms, quantum applications, or quantum operations. The algorithms component 210 may be used to perform or implement a stack or sequence of combinations of single qubit operations and/or multi-qubit operations (e.g., two-qubit operations) as well as extended quantum computations. The algorithms component 210 may also include software tools (e.g., compilers) that facility such performance or implementation. As such, the algorithms component 210 may provide, directly or indirectly, instructions to various components of the QIP system 200 (e.g., to the optical and trap controller 220) to enable the performance or implementation of the quantum algorithms, quantum applications, or quantum operations. The algorithms component 210 may receive information resulting from the performance or implementation of the quantum algorithms, quantum applications, or quantum operations and may process the information and/or transfer the information to another component of the QIP system 200 or to another device (e.g., an external device connected to the QIP system 200) for further processing.

The QIP system 200 may include the optical and trap controller 220 mentioned above, which controls various aspects of a trap 270 in the chamber 250, including the generation of signals to control the trap 270. The optical and trap controller 220 can include one or more optical sources and can be configured to generate and control the operation of lasers, optical systems/sources, and optical components that are used to provide the optical beams (e.g., lasers) that interact with the atoms or ions in the trap. Optical systems that include multiple components may be referred to as optical assemblies. The optical beams are used to set up the ions, to perform or implement quantum algorithms, quantum applications, or quantum operations with the ions, and to read results from the ions. Control of the operations of laser, optical systems, and optical components may include dynamically changing operational parameters and/or configurations, including controlling positioning using motorized mounts or holders. When used to confine or trap ions, the trap 270 may be referred to as an ion trap. The trap 270, however, may also be used to trap neutral atoms, Rydberg atoms, and other types of atomic-based qubits. The lasers, optical systems, and optical components can be at least partially located in the optical and trap controller 220, an imaging system 230, and/or in the chamber 250.

The QIP system 200 may include the imaging system 230. The imaging system 230 may include a high-resolution imager (e.g., CCD camera) or other type of detection device (e.g., PMT) for monitoring the ions while they are being provided to the trap 270 and/or after they have been provided to the trap 270 (e.g., to read results). In an aspect, the imaging system 230 can be implemented separate from the optical and trap controller 220, however, the use of fluorescence to detect, identify, and label ions using image processing algorithms may need to be coordinated with the optical and trap controller 220.

In addition to the components described above, the QIP system 200 can include a source 260 that provides atomic species (e.g., a plume or flux of neutral atoms) to the chamber 250 having the trap 270. When atomic ions are the basis of the quantum operations, that trap 270 confines the atomic species once ionized (e.g., photoionized). The trap 270 may be part of what may be referred to as a processor or processing portion of the QIP system 200. That is, the trap 270 may be considered at the core of the processing operations of the QIP system 200 since it holds the atomic-based qubits that are used to perform or implement the quantum operations or simulations. At least a portion of the source 260 may be implemented separate from the chamber 250.

It is to be understood that the various components of the QIP system 200 described in FIG. 2 are described at a high-level for ease of understanding. Such components may include one or more sub-components, the details of which may be provided below as needed to better understand certain aspects of this disclosure.

Aspects of this disclosure may be implemented at least partially using the QIP system 200 with the optical elements of a beam shaping structure as arranged therein.

Figure 3:
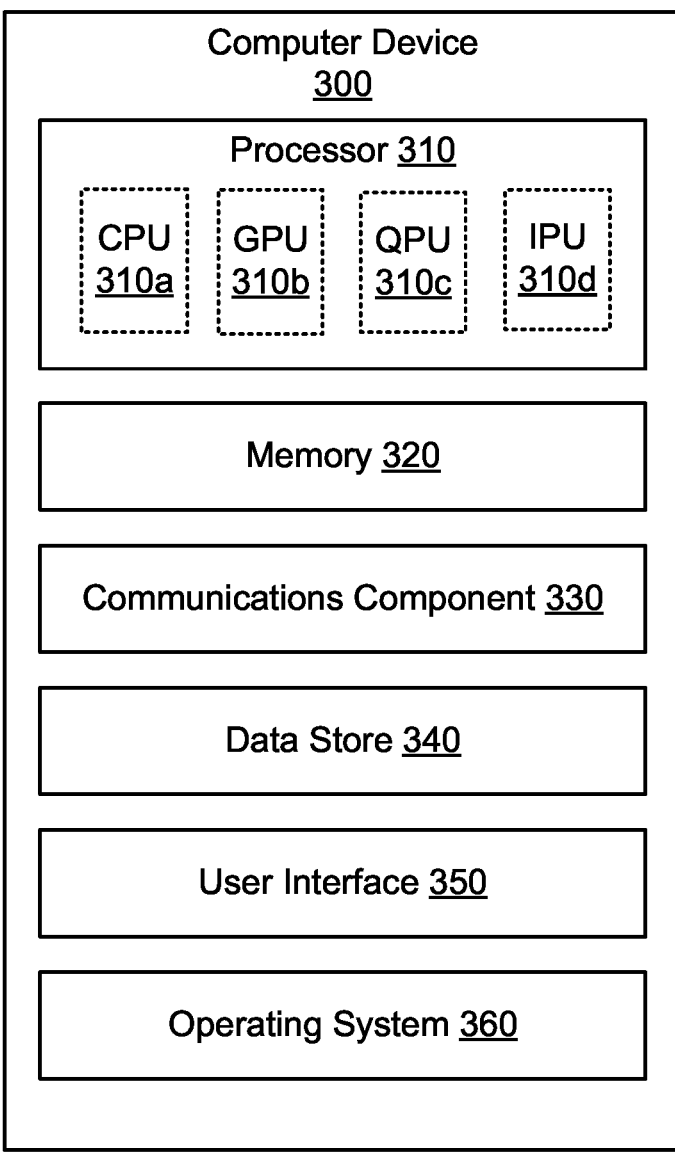
FIG. 3 illustrates an example of a computer device in accordance with aspects of this disclosure.

Referring now to FIG. 3, an example of a computer system or device 300 is shown. The computer device 300 may represent a single computing device, multiple computing devices, or a distributed computing system, for example. The computer device 300 may be configured as a quantum computer (e.g., a QIP system), a classical computer, or to perform a combination of quantum and classical computing functions, sometimes referred to as hybrid functions or operations. For example, the computer device 300 may be used to process information using quantum algorithms, classical computer data processing operations, or a combination of both. In some instances, results from one set of operations (e.g., quantum algorithms) are shared with another set of operations (e.g., classical computer data processing). A generic example of the computer device 300 implemented as a QIP system capable of performing quantum computations and simulations is, for example, the QIP system 200 shown in FIG. 2.

The computer device 300 may include a processor 310 for carrying out processing functions associated with one or more of the features described herein. The processor 310 may include a single processor, multiple set of processors, or one or more multi-core processors. Moreover, the processor 310 may be implemented as an integrated processing system and/or a distributed processing system. The processor 310 may include one or more central processing units (CPUs) 310a, one or more graphics processing units (GPUs) 310b, one or more quantum processing units (QPUs) 310c, one or more intelligence processing units (IPUs) 310d (e.g., artificial intelligence or AI processors), or a combination of some or all those types of processors. In one aspect, the processor 310 may refer to a general processor of the computer device 300, which may also include additional processors 310 to perform more specific functions (e.g., including functions to control the operation of the computer device 300). Quantum operations may be performed by the QPUs 310c. Some or all of the QPUs 310c may use atomic-based qubits, however, it is possible that different QPUs are based on different qubit technologies.

The computer device 300 may include a memory 320 for storing instructions executable by the processor 310 to carry out operations. The memory 320 may also store data for processing by the processor 310 and/or data resulting from processing by the processor 310. In an implementation, for example, the memory 320 may correspond to a computer-readable storage medium that stores code or instructions to perform one or more functions or operations. Just like the processor 310, the memory 320 may refer to a general memory of the computer device 300, which may also include additional memories 320 to store instructions and/or data for more specific functions.

It is to be understood that the processor 310 and the memory 320 may be used in connection with different operations including but not limited to computations, calculations, simulations, controls, calibrations, system management, and other operations of the computer device 300, including any methods or processes described herein.

Further, the computer device 300 may include a communications component 330 that provides for establishing and maintaining communications with one or more parties utilizing hardware, software, and services. The communications component 330 may also be used to carry communications between components on the computer device 300, as well as between the computer device 300 and external devices, such as devices located across a communications network and/or devices serially or locally connected to computer device 300. For example, the communications component 330 may include one or more buses, and may further include transmit chain components and receive chain components associated with a transmitter and receiver, respectively, operable for interfacing with external devices. The communications component 330 may be used to receive updated information for the operation or functionality of the computer device 300.

Additionally, the computer device 300 may include a data store 340, which can be any suitable combination of hardware and/or software, which provides for mass storage of information, databases, and programs employed in connection with the operation of the computer device 300 and/or any methods or processes described herein. For example, the data store 340 may be a data repository for operating system 360 (e.g., classical OS, or quantum OS, or both). In one implementation, the data store 340 may include the memory 320. In an implementation, the processor 310 may execute the operating system 360 and/or applications or programs, and the memory 320 or the data store 340 may store them.

The computer device 300 may also include a user interface component 350 configured to receive inputs from a user of the computer device 300 and further configured to generate outputs for presentation to the user or to provide to a different system (directly or indirectly). The user interface component 350 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 may include one or more output devices, including but not limited to a display, a speaker, a haptic feedback mechanism, a printer, any other mechanism capable of presenting an output to a user, or any combination thereof. In an implementation, the user interface component 350 may transmit and/or receive messages corresponding to the operation of the operating system 360. When the computer device 300 is implemented as part of a cloud-based infrastructure solution, the user interface component 350 may be used to allow a user of the cloud-based infrastructure solution to remotely interact with the computer device 300.

In connection with the systems described in FIGS. 1-3, in one or more implementations, the QIP systems as disclosed herein include beam shaping structures inserted into the QIP system that are less alignment sensitive and remove or minimize beam displacement effects from beam shaping. Such systems hold up for arbitrary magnifications or demagnifications along one axis.

FIGS. 4A-4D illustrate respective views of an exemplary beam shaping structure 400 for implementation into a QIP system (e.g., QIP system 200). According to an exemplary aspect, the exemplary beam shaping structure 400 can be implemented as one or more optical sources that are part of or coupled to the optical and trap controller 220 according to an exemplary aspect.

As shown, the beam shaping structure 400 includes a housing 410 that contains individual elements therein. In one or more implementations, the beam shaping structure 400 can be releasably coupled or decoupled from the QIP system. In this way, the beam shaping structure 400 advantageously can be quickly and easily replaced from its location in the laser beam path for a beam shaping structure having different elements, or an entirely different optomechanical or mechanical structure. This arrangement provides flexibility in modifying the desired properties of the laser beam of the system—e.g., changing laser beam magnification for shaping the laser beam to have a different aspect ratio than the original laser beam.

The housing 410 can include various fastening locations 412 by which the housing can be secured to, or unsecured from, the QIP system. For example, the housing 410 can be secured to the QIP system by bolts, screws, pins, clips, adhesives, fasteners, or other securing mechanisms as are known in the art.

In one or more implementations, the beam shaping structure 400 includes various optical elements coupled to the housing 410 in order to achieve desired beam shaping effects. In the exemplary implementation illustrated by FIGS. 4A-4D, the beam shaping structure 400 includes a first prism 420, a mirror 425, and a second prism 430. The first and second prisms 420, 430 can be of any suitable shape according to the desired beam shaping. For example, the prisms 420, 430 can be rectangular, square, triangular (e.g., a 30/60/90 degree prism), cylindrical, trapezoidal, hexagonal, or other regular or irregular shapes. In one or more implementations, the first and second prisms 420, 430 have the same shape. In one or more implementations the first and second prisms 420, 430 have different shapes.

While the beam shaping structure 400 is disclosed in one or more exemplary implementations as including a prism pair and mirror, in one or more implementations, the beam shaping structure includes optical elements that each have a plurality of glass surfaces arranged at an angle to one another.

In one or more implementations, one or more optical elements of the beam shaping structure 400 include coating on the surfaces of the elements. For example, the coating can be optimized to introduce a degree of sensitivity to polarization. By introducing coating to one or more surfaces of the optical elements of beam shaping structure 400, the propagated laser beam is provided an additional degree of freedom.

The first prism 420, the mirror 425, and the second prism 430 can be coupled to the housing 410 by any conventional fastening mechanisms. For example, these optical elements can be secured to the housing 410 by bolts, screws, pins, clips, adhesives, fasteners, or other securing mechanisms as are known in the art. In this way, the housing 410 is compatible with a variety of optical elements and permits easy exchange of optical elements if necessary.

In one or more implementations, the first prism 420, the mirror 425, and the second prism 430 are arranged in the housing such that the mirror is located between the first and second prisms. For example, as illustrated by FIG. 4D, in one or more implementations, the first prism 420, the mirror 425, and the second prism 430 are arranged collinearly or coaxially in one or more directions. It is noted that while FIGS. 4A-4D illustrate a beam shaping structure 400 having a single mirror, in one or more implementations the beam shaping structure can include a plurality of mirrors arranged in the housing 410 according to an exemplary aspect.

Moreover, in one or more implementations, the first prism 420, the mirror 425, and the second prism 430 are arranged in the housing to be offset from one another at predetermined angles. For example, as shown by FIGS. 4A-4C, the prisms 420, 430 can be raised above the mirror 425 and angled toward or away from the mirror depending on the desired beam shaping.

Figure 4A:
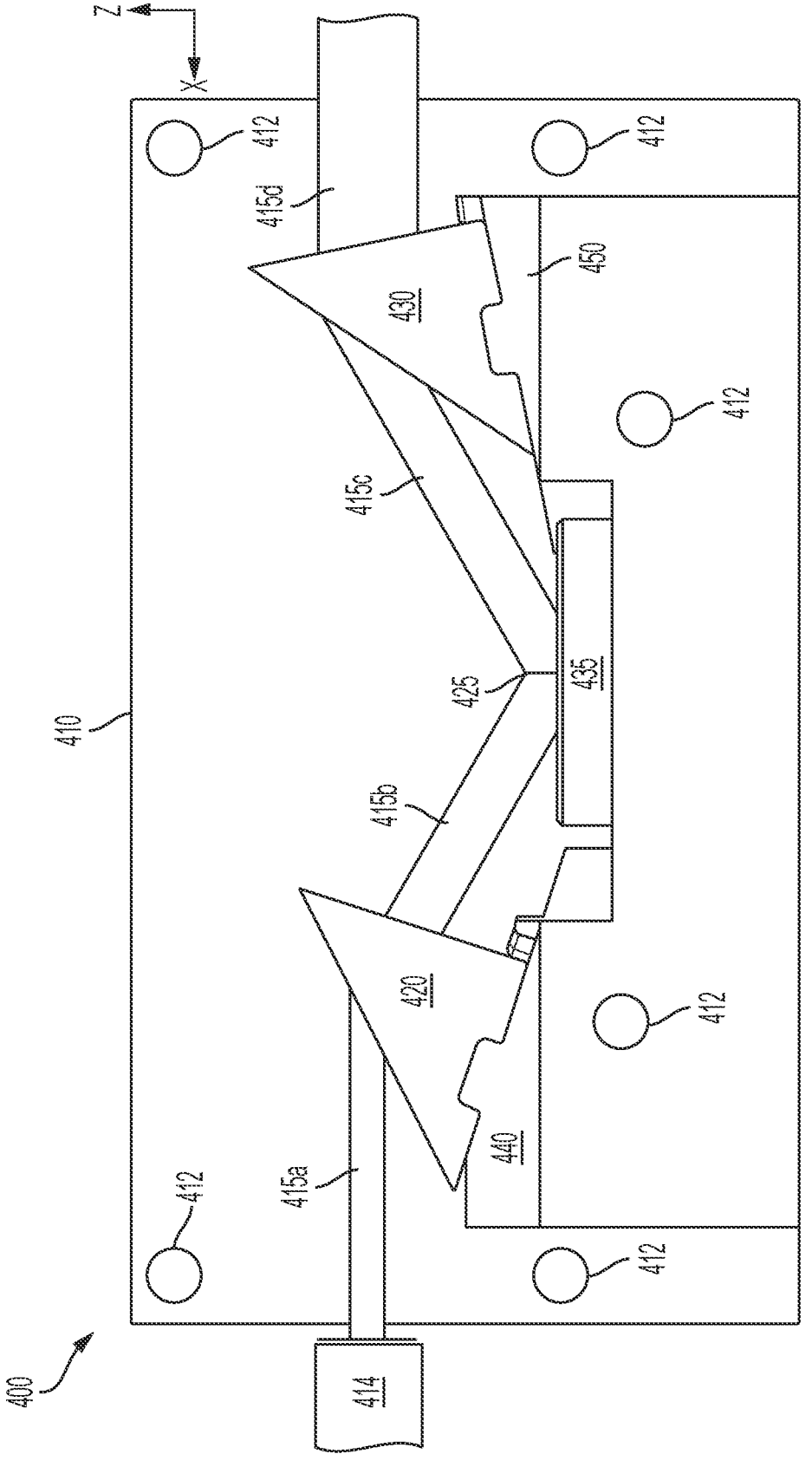
FIG. 4A illustrates a front view of an exemplary beam shaping structure in accordance with aspects of this disclosure.
Figure 4B:
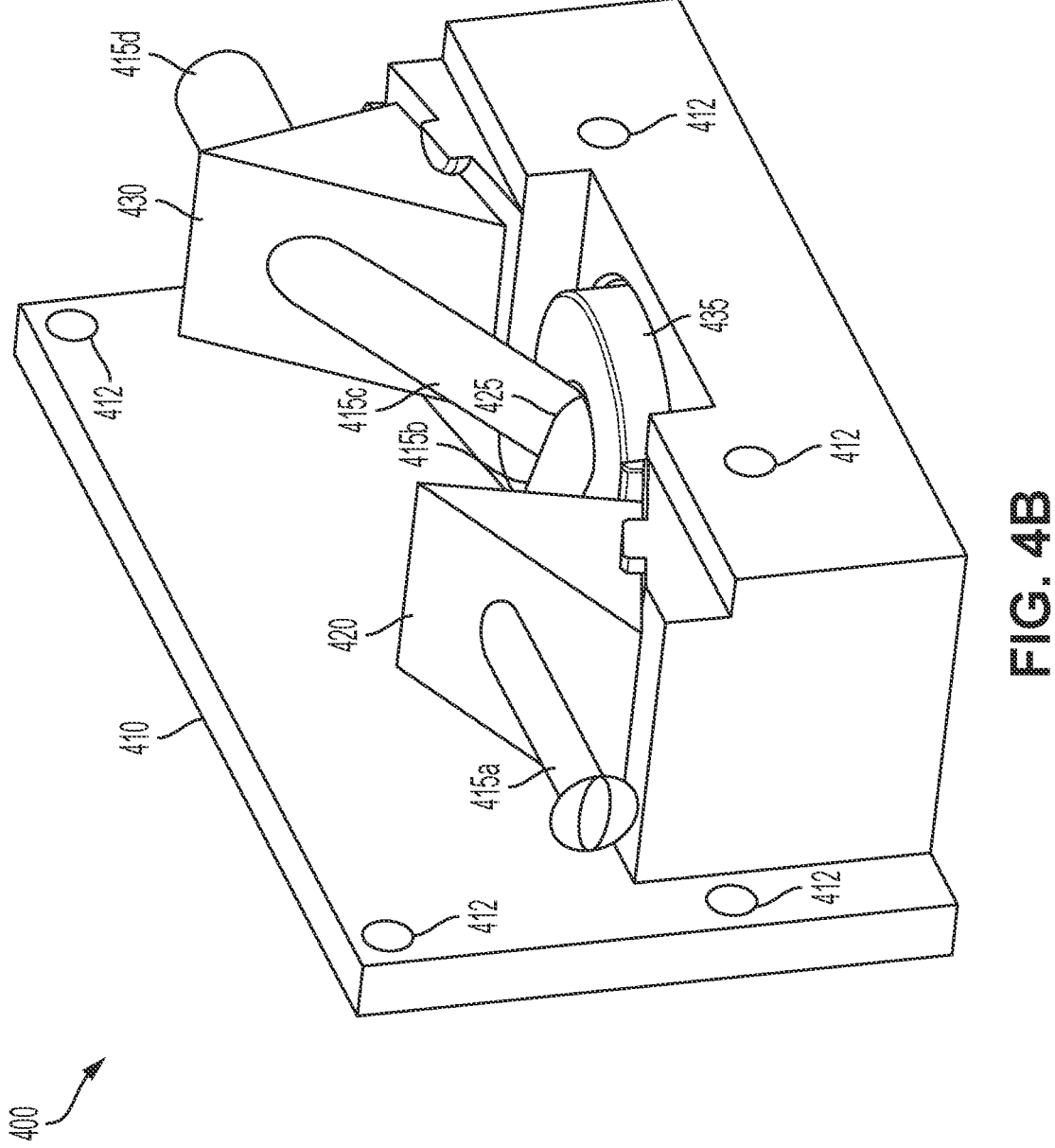
FIG. 4B illustrates a left perspective view of an exemplary beam shaping structure in accordance with aspects of this disclosure.
Figure 4C:
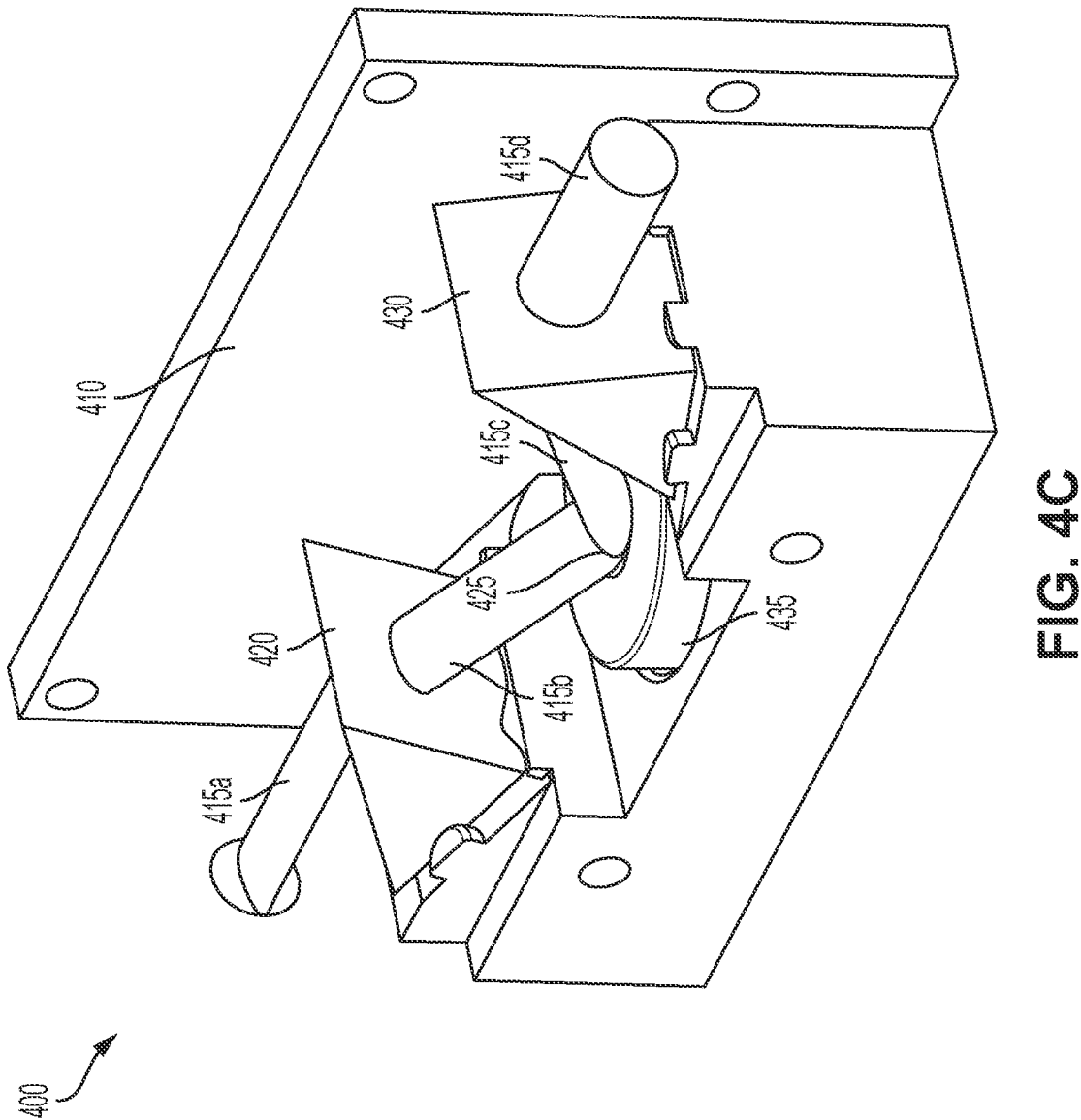
FIG. 4C illustrates a right perspective view of an exemplary beam shaping structure in accordance with aspects of this disclosure.
Figure 4D:
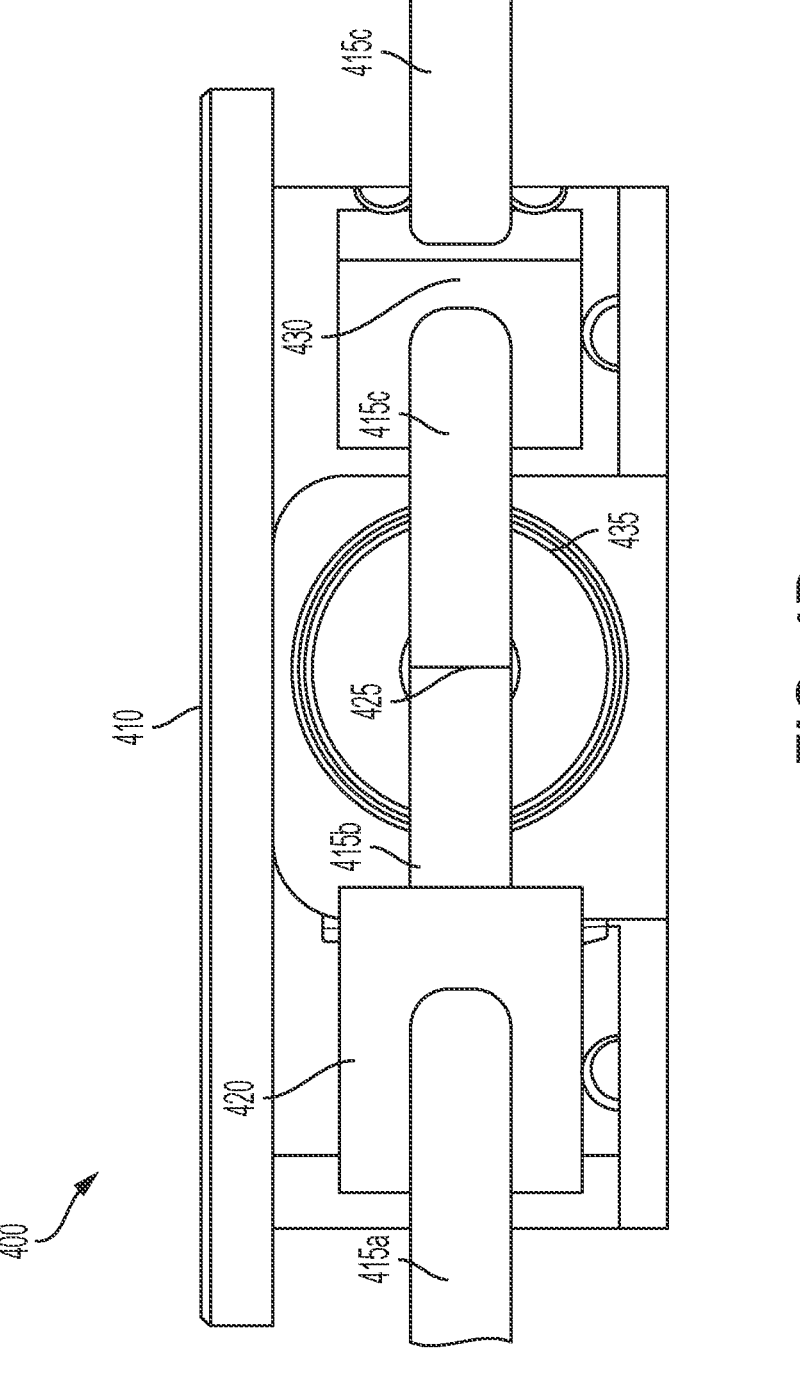
FIG. 4D illustrates a top view of an exemplary beam shaping structure in accordance with aspects of this disclosure.

Referring to FIG. 4A, a laser beam source 414 (e.g., an optical source) is provided that is configured to generate a laser beam having a particular geometry according to the exemplary aspects described herein. In particular, the laser beam source 414 can be of any type suitable for use in QIP systems and interacting with trapped ions. In one or more implementations, the laser beam source 414 generates a single laser beam. In one or more implementations, the laser beam source 414 generates an array of laser beams. A generated laser beam includes an initial aspect ratio, the aspect ratio being defined by the ratio of width of the beam to the height of the beam. The laser beam generated by the laser beam source 414 thereafter travels along a beam path 415a-415d.

After the laser beam is generated, the locations of first and second prisms 420, 430 and the mirror 425 can be used to vary the geometric shape of laser beam. For example, the laser beam can be shaped to be in the form of a line, a circle, an ellipse, a square, a rectangle, or other two-dimensional shape.

As illustrated by FIGS. 4A-4D, the laser beam source 414 generates the laser beam outside the beam shaping structure 400, which then travels to the first prism 420 along beam path 415*a*. The laser beam is received by the first prism 420 at an angle relative to the outer surface of the first prism and refracts the laser beam as it passes through the outer surface. In this way, the laser beam radius is changed in one axis and the laser beam is set along a different laser beam path 415*b*—i.e., the laser beam is magnified or de-magnified. Thereafter, the laser beam path 415*b* reaches the mirror 425, where the laser beam is reflected in a new direction. This new direction, as shown by beam path 415*c*, directs the laser beam with a modified radius toward the second prism 430. The laser beam is then received by the second prism 430 at an angle relative to the outer surface of the second prism and refracts the laser beam as it passes through the outer surface. In this way, the laser beam radius is changed again in one axis and the laser beam is set along a beam path 415*d* with a changed aspect ratio relative to the laser beam along beam path 415*a*—e.g., the beam is reshaped from a round to elliptical beam spot. In one or more implementations, after exiting the second prism 430, the laser beam has an adjusted aspect ratio and has no or little beam displacement relative to the beam direction along beam path 415*a* as compared to beam path 415*d*.

While the beam paths 415*a*-415*d* are depicted as permitting the laser beam to pass through the first prism 420, reflect off the mirror 425, and pass through the second prism 430, the beam shaping structure 400 is not restricted to a unidirectional beam path. For example, if the above beam path creates a magnification effect of the beam that increases the aspect ratio, if the beam shaping structure 400 were to be located in the QIP system in a mirrored orientation—i.e., re-oriented 180 degrees such that the laser beam passes through the second prism 430, then reflects off the mirror 425, then passes through the first prism 420—the beam path created would include a corresponding de-magnification effect of the beam to decrease the aspect ratio.

In one or more implementations, the housing 410 can include one or more kinematic rotating or movable platforms that support or receive one or more of the optical elements of the beam shaping structure 400. For example, the mirror 425 may be configured to be received and coupled to a rotating platform 435. The rotating platform 435 may be motorized. In one or more implementations, the rotating platform 435 can rotate the mirror 425 in order to adjust alignment and reflect the laser beam on a different beam path toward the second prism 430. In one or more implementations, the rotating platform 435 is configured to receive a plurality of mirrors such that rotation of the platform exchanges one mirror configured to reflect the laser beam along a first beam path to the second prism with a further mirror configured to reflect the laser beam along a second beam path to the second prism. In such implementations, the plurality of mirrors are at different angles relative to the first prism and second prism. Further, the housing 410 can include one or more rotating or movable platforms 440, 450 that support or receive the first and/or second prisms 420, 430. Rotation of these platforms 440, 450 can rotate or move the prisms to adjust the refraction of the laser beam and thus adjust magnification.

In one or more implementations, the beam shaping structure 400 can include different configurations of optical elements. For example, in addition to the first and second prisms 420, 430 and the mirror 425, the beam shaping structure 400 can include a second mirror arranged in the housing to reflect the laser beam after it passes through the second prism and a third prism arranged in the housing to receive the laser beam after it reflects off the second mirror. In this arrangement, the second mirror and the third prism are arranged at angles to one another to further reshape the laser beam. In this way, the beam shaping structure 400 can reshape the laser beam along more than one axis.

In one or more implementations, the beam shaping structure 400 includes a second pair of prisms and a second mirror arranged in the housing. The first pair of prisms (e.g., prisms 420, 430) can be arranged at an angle relative to a second pair of prisms in order to shape the laser beam in a desired way. For example, the second pair of prisms can be arranged at a 90 degree angle to the first pair of prisms. In this way, depending on which direction the second pair of prisms is rotated, the second pair of prisms can serve to magnify or de-magnify the laser beam further. For example, in an arrangement in which the first and second pairs of prisms are both arranged in the magnifying or de-magnifying direction, the beam shaping structure 400 serves as a beam expander or reducer along one or more axes. In another example implementation, in an arrangement in which the first pair of prisms is arranged in the magnifying direction and the second pair of prisms is arranged in the de-magnifying direction, the beam shaping structure 400 serves as a beam expander along a first axis and a beam reducer along a second axis. Such a configuration achieves larger aspect ratios, while maintaining smaller angle-of-incidence on each prism.

In one or more implementations, the aspect ratio of the beam spot can be adjusted by the beam shaping structure 400 to be between 0.1 and 10. In one or more implementations, the aspect ratio of the beam spot can be adjusted by the beam shaping structure 400 to be between 0.01 and 100. In one more implementations the aspect ratio of the beam spot can be adjusted by the beam shaping structure 400 to be between 1 and 6, 1 and 8, or 1 and 10.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A quantum information processing (QIP) system comprising:

an ion trap configured to confine one or more ions;

an optical source configured to generate a laser beam that is applied to the one or more ions; and a beam shaping structure that includes:

a housing, a first prism arranged in the housing to receive the laser beam, a mirror arranged in the housing to reflect the laser beam after the laser beam passes through the first prism, and a second prism arranged in the housing to receive the laser beam after the laser beam reflects off the mirror, wherein the first prism, the mirror, and the second prism are arranged at angles relative to one another that are configured to reshape the laser beam.

2. The system of claim 1, wherein the beam shaping structure is configured to reshape the beam to a predetermined aspect ratio.

3. The system of claim 2, wherein the predetermined aspect ratio is between 0.01 and 100.

4. The system of claim 2, wherein the predetermined aspect ratio is between 0.1 to 10.

5. The system of claim 1, wherein the first prism is a rectangular prism.

6. The system of claim 1, wherein the first prism is a 30/60/90 prism.

7. The system of claim 1, further comprising a rotating platform arranged in the housing to receive the mirror.

8. The system of claim 7, wherein the rotating platform is configured to receive a plurality of mirrors at different angles relative to the first prism and second prism.

9. The system of claim 1, further comprising a rotating platform arranged in the housing to receive the first or second prisms.

10. The system of claim 1, wherein the first prism, the mirror, and the second prism are arranged at angles relative to one another that are configured to reshape the laser beam to a round shape.

11. The system of claim 1, wherein the first prism, the mirror, and the second prism are arranged at angles relative to one another that are configured to reshape the laser beam to an elliptical shape.

12. The system of claim 2, wherein the beam shaping structure further comprises:

a second mirror arranged in the housing and configured to reflect the laser beam after the laser beam passes through the second prism, and a third prism arranged in the housing and configured to receive the laser beam after the laser beam reflects off the second mirror, wherein the second mirror and the third prism are arranged at angles relative to one another and further configured to further reshape the laser beam.

13. The system of claim 12, wherein the laser beam is reshaped to a predetermined aspect ratio in an axis different than that of the first prism, the mirror, and the second prism.

14. The system of claim 2, wherein the beam shaping structure is replaceable by a second beam shaping structure including:

a second housing, a third prism arranged in the second housing and configured to receive the laser beam, a second mirror arranged in the second housing and configured to reflect the laser beam after the laser beam passes through the third prism, and a fourth prism arranged in the second housing and configured to receive the laser beam after the laser beam reflects off the second mirror, wherein the third prism, the second mirror, and the fourth prism are arranged at angles relative to one another and are further configured to reshape the laser beam to a different aspect ratio than the predetermined aspect ratio formed by the beam shaping structure.

15. The system of claim 1, wherein the beam shaping structure further comprises:

a third prism arranged in the housing and configured to receive the laser beam, a second mirror arranged in the housing and configured to reflect the laser beam after the laser beam passes through the third prism, and a fourth prism arranged in the housing and configured to receive the laser beam after the laser beam reflects off the second mirror, wherein the third prism, the second mirror, and the fourth prism are arranged at angles relative to one another and are further configured to reshape the laser beam and magnify the laser beam in a same direction as the first prism, the mirror, and the second prism.

16. The system of claim 1, wherein the beam shaping structure further comprises:

a third prism arranged in the housing and configured to receive the laser beam, a second mirror arranged in the housing laser beam to reflect the laser beam after the laser beam passes through the third prism, and a fourth prism arranged in the housing laser beam to receive the laser beam after the laser beam reflects off the second mirror, wherein the third prism, the second mirror, and the fourth prism are arranged at angles relative to one another and are further configured to reshape the laser beam and magnify the laser beam in a different direction as the first prism, the mirror, and the second prism.

17. The system of claim 1, wherein at least one of the first prism, the mirror, or the second prism includes a coating on a surface.

18. A quantum information processing (QIP) system comprising:

an ion trap configured to confine one or more ions;

an optical source configured to generate a laser beam that is applied to the one or more ions; and a beam shaping structure, the beam shaping structure including, a housing, and a first prism and a second prism arranged in the housing and configured to receive the laser beam, wherein the first prism and the second prism are arranged at angles relative to one another and configured to reshape the laser beam.

19. A quantum information processing (QIP) system comprising:

an ion trap configured to confine one or more ions;

an optical source configured to generate a laser beam that is applied to the one or more ions; and a beam shaping structure including:

a housing, a first optical element arranged in the housing and having a plurality of surfaces to receive the laser beam, a mirror arranged in the housing and configured to reflect the laser beam after the laser beam passes through the first optical element, and a second optical element arranged in the housing and having a plurality of surfaces configured to receive the laser beam after the laser beam reflects off the mirror, wherein the first optical element, the mirror, and the second optical element are arranged at angles relative to one another and configured to reshape the laser beam.

20. The system of claim 19, wherein the plurality of surfaces of the first optical element are arranged at an angle from one another.

\* \* \* \* \*